No. 852,196.

PATENTED APR. 30, 1907.

R. S. PEASE.
APPARATUS FOR DELIVERING MOLTEN GLASS.
APPLICATION FILED JUNE 20, 1906.

2 SHEETS—SHEET 1.

Witnesses:
S. R. Rodd
Chas. S. Ripley

Inventor:
Roger S. Pease
by C. M. Clarke
his attorney

No. 852,196. PATENTED APR. 30, 1907.
R. S. PEASE.
APPARATUS FOR DELIVERING MOLTEN GLASS.
APPLICATION FILED JUNE 20, 1906.

2 SHEETS—SHEET 2.

Witnesses:
E. R. Rodd
Chas. S. Lepley

Inventor:
Rogers Pease
by V. M. Clarke
his attorney

UNITED STATES PATENT OFFICE.

ROGER S. PEASE, OF ALLEGHENY, PENNSYLVANIA, ASSIGNOR TO ALFRED M. LEE, TRUSTEE, OF PITTSBURG, PENNSYLVANIA.

APPARATUS FOR DELIVERING MOLTEN GLASS.

No. 852,196.     Specification of Letters Patent.     Patented April 30, 1907.

Application filed June 20, 1906. Serial No. 322,502.

*To all whom it may concern:*

Be it known that I, ROGER S. PEASE, a citizen of the United States, residing at Allegheny, in the county of Allegheny and State of Pennsylvania, have invented certain new and useful Improvements in Apparatus for Delivering Molten Glass, of which the following is a specification, reference being had therein to the accompanying drawings.

My invention refers to improvements in apparatus for the manufacture of glass articles, and is more particularly adapted for the manufacture of glass cylinders for window glass.

It has for its object to provide a delivering vessel so arranged in combination with a tank or other source of supply from which the molten glass may be delivered from time to time into the vessel, and by which a fresh quantity of fined and strained glass may be presented for each drawing operation.

The invention involves the combination with the tank etc. of a partly rotatable vessel having a receiving orifice and oppositely directed chambers or compartments into which the glass will flow alternately upon partly rotating the pot, said chambers being also arranged to co-operate with a draft flue alternately, as will be more fully hereinafter described.

Figures 1, 2:
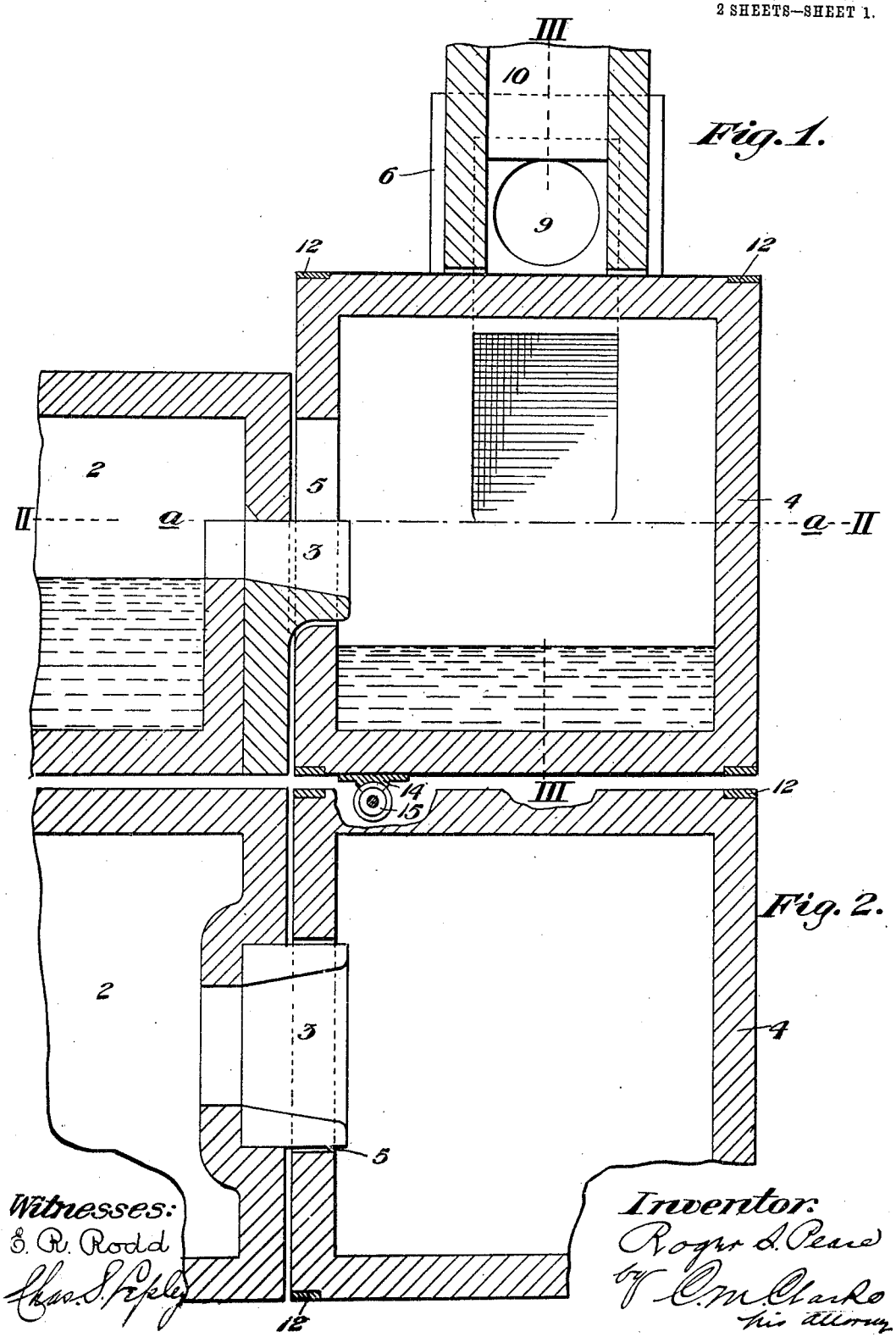
Figure 3:
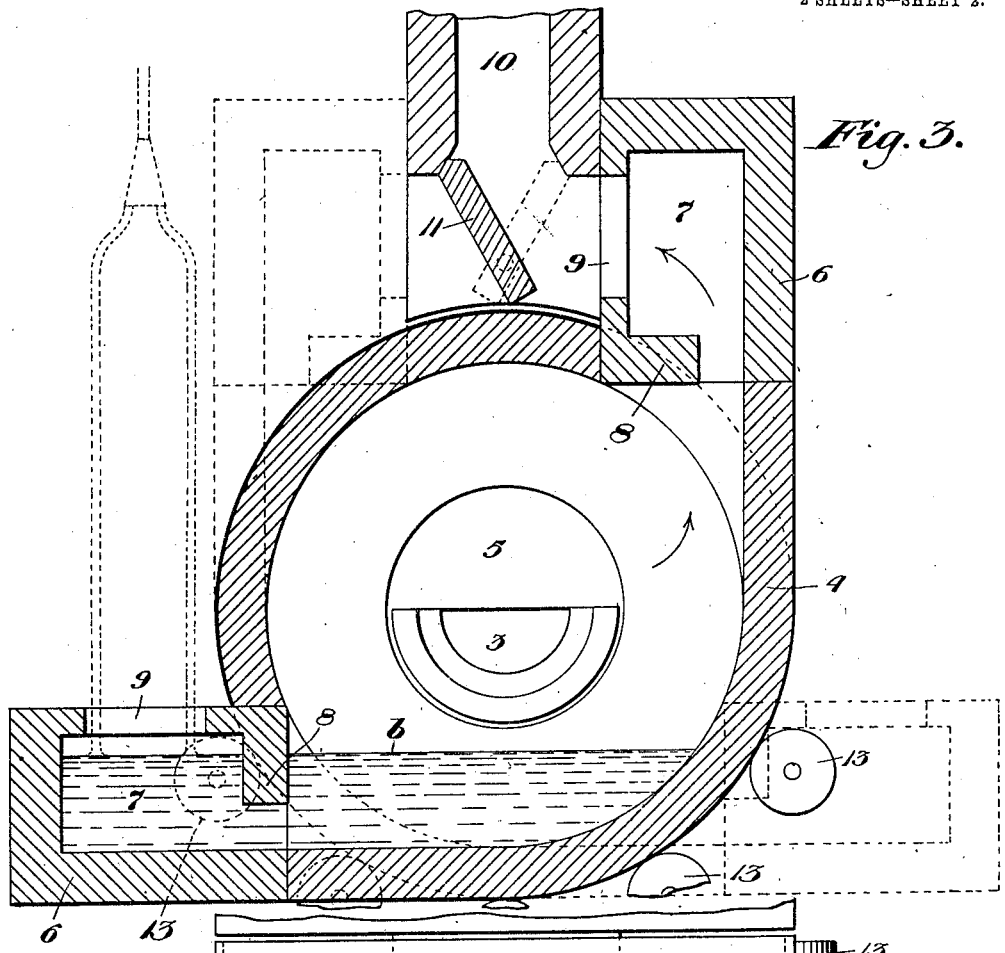
Figure 4:
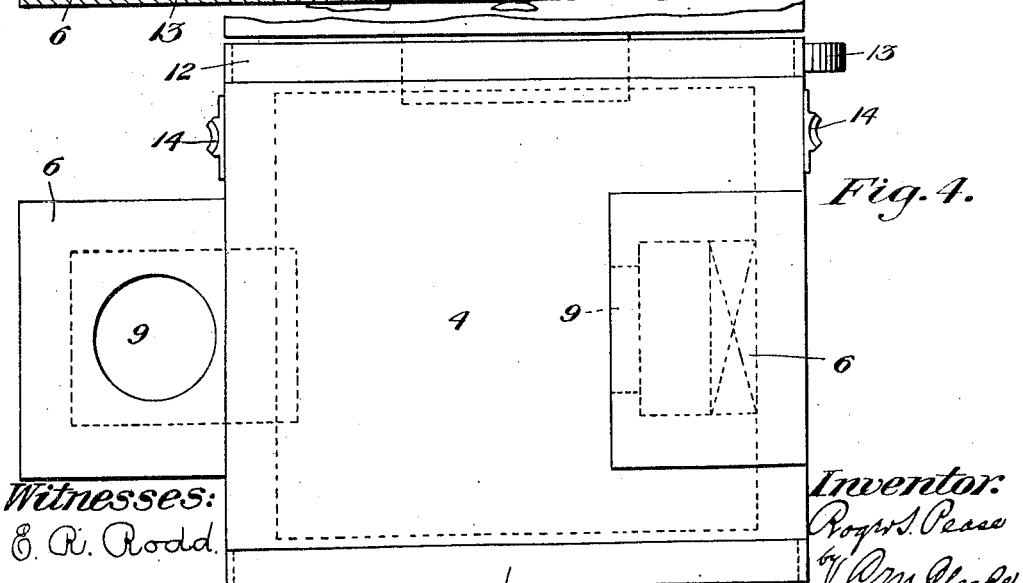

Referring to the drawings; Figure 1. is a central longitudinal vertical section through a portion of a glass melting tank, the rotatable delivering vessel, and a portion of the outlet flue. Fig. 2. is a horizontal sectional view on the line II. II. of Fig. 1. Fig. 3. is a transverse vertical section on the line III. III. of Fig. 1. Fig. 4. is a plan view of the vessel, the flue having been removed.

In the drawings, 2 represents a tank of any suitable construction in which the molten glass is melted and contained, provided with a delivery spout 3, preferably made separate so as to be renewed from time to time.

4 is the delivering vessel, generally cylindrical in form and provided with an opening 5 at one end surrounding the spout 3 whereby glass may be delivered to the interior of the vessel at varying positions thereof. Extending transversely of the axial center *a, a,* of the vessel and forming continuations thereof, generally arranged in directions at right angles to each other, are the chambers 6, 6, which, like spout 3, are preferably made separable from the vessel body in order to allow of renewal or re-lining as worn.

As shown in Fig. 3 each chamber 6 is provided with a glass-containing cavity 7 and an inner bridge wall 8 projecting downwardly considerably below the normal level *b* of the glass, so that as the glass flows outwardly into chamber 7 when the vessel is tipped to one side or the other, it will be strained from any bubbles or other lighter impurities, thus presenting a solid mass of pure clean glass.

Each chamber section 6 is provided at its upper portion (when in drawing position) with a drawing opening 9, preferably cylindrical in form, through which the glass cylinder may be drawn in the usual manner employed in such method of manufacture, as indicated in dotted lines in Fig. 3, or the opening may be long and narrow for drawing sheets.

10 is a flue suspended above the pot 4 and arranged centrally thereof, with which the opening 9 of each chamber 6 will make communicating contact alternately as shown at the right of Fig. 3. The relative positions of the chambers are reversed for each drawing operation, which occurs alternately at one side or the other of the vessel, and in order to provide for communication of the furnace gases with flue 10 for both positions, a damper 11 is mounted in the lower portion of the flue, capable of being thrown over as shown in dotted lines for the alternate operation.

The vessel 4 may be made of fire brick, clay, or any refractory material and surrounded by sheet metal as will be readily understood, being properly reinforced in any convenient manner as by strengthening bands 12. The vessel is mounted upon any suitable rolling supports as a plurality of wheels or rollers 13 adapted to bear upon the metal bands 12 thus securely supporting the entire apparatus and positively centralizing it with relation to the charging spout 3 and flue 10.

Any suitable means may be employed for tilting the vessel, as a worm segment 14 and worm 15 operated by hand or machinery.

The operation of the invention will be readily understood from the foregoing description. Glass may be charged into the interior of the vessel from time to time by spout 3 which is always in register, whether the vessel is stationary or being tilted, and upon tilting it over a quarter turn to one side or the other the glass will flow outwardly into one or the other chamber 7, the unused chamber making communicating connection with the flue. By this means the circulation of the gases will maintain the contained glass at the desired temperature; the glass in chamber 7 will always be in condition for drawing, and the device thus avoids the objections of the usual pot into which the charge of glass is ladled from time to time.

It will be understood that the apparatus may be made in any capacity, size or design, it may be provided with two or more drawing openings at each side if desired, and may be otherwise changed or varied by the skilled mechanic, but all such changes are to be considered as within the scope of the following claims.

What I claim is:

1. A rotatable glass holding vessel provided with a receiving opening and a laterally extending drawing chamber, substantially as set forth.

2. A rotatable glass holding vessel provided with a receiving opening and a removable laterally extending drawing chamber, substantially as set forth.

3. A rotatable glass holding vessel provided with a laterally extending drawing chamber, substantially as set forth.

4. A rotatable glass holding vessel provided with a receiving opening and a laterally extending drawing chamber, and having a bridge wall extending downwardly below the normal level of the contained glass, substantially as set forth.

5. A rotatable glass holding vessel provided with a receiving opening and oppositely extending drawing chambers provided with downwardly extending bridge walls and adapted to receive a quantity of glass from the interior cavity, substantially as set forth.

6. A rotatable glass holding vessel provided with a receiving opening and oppositely extending drawing chambers provided with upwardly opening drawing apertures, and oppositely extending bridge walls projecting downwardly below the normal level of the contained glass, substantially as set forth.

7. The combination with a stationary glass-containing vessel, of a relatively movable receiving and delivering vessel provided with a laterally extending drawing compartment, substantially as set forth.

8. The combination with a stationary glass-containing vessel, of a relatively movable receiving and delivering vessel provided with oppositely arranged laterally extending drawing compartments communicating with its main interior cavity and arranged to be located alternately in drawing position upon partial tipping of the vessel, substantially as set forth.

9. The combination with a stationary glass-containing vessel and an outlet flue, of a tipping vessel arranged to receive glass in its interior, and having laterally arranged drawing compartments adapted to be alternately positioned for drawing and in communication with said flue, substantially as set forth.

10. The combination with a stationary glass containing vessel having a projecting spout, of a tipping vessel provided with an aperture surrounding the spout and having a laterally extending drawing compartment, substantially as set forth.

11. The combination with a stationary glass-containing vessel having a projecting spout, of a tipping vessel provided with an aperture surrounding the spout and having oppositely extending drawing compartments adapted to be located in drawing position and in registering position with an outlet flue alternately, substantially as set forth.

12. The combination with a stationary glass-containing vessel having a delivery spout, of a vessel located below said spout having a laterally projecting delivering compartment, means for providing a rolling support for the vessel, and means for rotating the vessel upon said supports, substantially as set forth.

13. The combination with a tilting receiving vessel, of a separably attached withdrawing chamber, substantially as set forth.

14. The combination with a tilting receiving vessel, of oppositely disposed separably attached withdrawing chambers, substantially as set forth.

15. The combination with a movable receiving vessel having a charging opening, of a stationary glass-containing receptacle having a separable delivering spout attached thereto and projecting through the charging opening into the interior of the receiving vessel, substantially as set forth.

16. The combination with a stationary glass-containing receptacle having a separable delivery spout, of a relatively movable vessel having an aperture surrounding the spout and provided with a plurality of separable withdrawing compartments, substantially as set forth.

17. The combination with a stationary glass-containing receptacle having a separable delivery spout, and a downwardly depending flue; of a movable vessel having oppositely extending withdrawing compartments adapted to be positioned for drawing and in communicating relation to said flue alternately, substantially as set forth.

18. The combination with a downwardly depending flue having a damper gate, of a relatively movable glass containing vessel having oppositely extending withdrawing compartments adapted to make alternate communicating contact with said flue during the time that the other compartment is in withdrawing position, substantially as set forth.

In testimony whereof I affix my signature in presence of two witnesses.

ROGER S. PEASE.

Witnesses:
 CHAS. S. LEPLEY,
 C. M. CLARKE.